United States Patent
Jones

(10) Patent No.: US 6,915,959 B2
(45) Date of Patent: Jul. 12, 2005

(54) APPARATUS AND METHOD FOR MONITORING OF AN AUTOMATIC DEICING CONTROLLER

(75) Inventor: Thaddeus M. Jones, Bremen, IN (US)

(73) Assignee: MSX, Inc., South Bend, IN (US)

(*) Notice: Subject to any disclaimer, the term of this patent is extended or adjusted under 35 U.S.C. 154(b) by 0 days.

(21) Appl. No.: 10/607,237

(22) Filed: Jun. 26, 2003

(65) Prior Publication Data

US 2004/0262413 A1 Dec. 30, 2004

(51) Int. Cl.[7] .............................................. G05D 23/00
(52) U.S. Cl. ...................................... 237/2 A; 219/483
(58) Field of Search .......................... 237/2 A, 80, 69; 219/483, 486, 497, 506, 494; 307/38, 39, 40, 41

(56) References Cited

U.S. PATENT DOCUMENTS

| | | | | |
|---|---|---|---|---|
| 3,909,601 A | * | 9/1975 | Yamawaki et al. | ............ 700/70 |
| 4,459,815 A | * | 7/1984 | Yokoyama | ................... 62/180 |
| 5,167,002 A | * | 11/1992 | Fridhandler | ................. 388/815 |
| 5,643,482 A | * | 7/1997 | Sandelman et al. | ......... 219/497 |
| 5,900,178 A | * | 5/1999 | Johnsen | ....................... 219/497 |
| 6,428,671 B1 | * | 8/2002 | Sogo et al. | .................. 204/623 |
| 6,472,898 B1 | * | 10/2002 | Hollmer et al. | ............. 324/765 |

* cited by examiner

Primary Examiner—Derek S. Boles
(74) Attorney, Agent, or Firm—Taylor & Aust, P.C.

(57) ABSTRACT

An ice and snow melting heater control assembly including at least one sensor, at least one heater element and a controller communicatively coupled with the at least one sensor and the at least one heater element, the controller directing status information about at least one sensor to the at least one heater element.

23 Claims, 3 Drawing Sheets

APPARATUS AND METHOD FOR MONITORING OF AN AUTOMATIC DEICING CONTROLLER

BACKGROUND OF THE INVENTION

1. Field of the Invention

The present invention relates to deicing equipment, and, more particularly, to automatic controls for deicing equipment used to melt and remove snow and ice from pavement, roofs, gutters, downspouts and the like.

2. Description of the Related Art

Electric and hydronic heaters are commonly used to melt ice and snow. Applications include pavement and similar structures, but also include roofs, downspouts and gutters. Pavement applications include sidewalks, driveways, stairs, drive through window areas, building portals, loading docks, bridge decks, parking garages and off ramps, etc.

Typically, automatic controls are utilized to sense ambient temperature and moisture to control ice removal heating equipment. Heater elements may include hydronic tubing installed under or proximate to areas in which the removal of ice or snow is desirable. Hydronic systems include an interface with a heating system that provides energy for the removal of ice and snow. Electrical heating cables may also be employed that consist of stranded copper wires separated by a semi-conductor polymer enclosed in one or more layers of organic insulating material, this type of electrical cable is often referred to as self-limiting or self-regulating heating cable. Additionally, an insulated resistant wire may be used, which maintains a relatively constant resistance as it dissipates heat. The insulation may consist of magnesium oxide or various polymeric materials.

The status of, and functioning of, the automatic control can be determined by way of a visual indicator on the control or an electrical interface to which an electrical device can be connected to analyze the functioning of the control. The visual indicator thereon may indicate the sensed temperature, the presence of electrical power and whether moisture is detected. Additionally, the automatic control can be checked if the temperature and moisture are controlled to a point of causing the controller to energize the heating system to thereby verify operation of the control system.

What is needed in the art is an automatic heater controller that can convey its status without the need for, and the cost of, a display or an electrical interface on the controller or the need to physically simulate an environment in which to turn on the heating system.

SUMMARY OF THE INVENTION

The present invention provides an apparatus and monitoring method in which the heater control can be monitored.

The invention comprises common in one form thereof, an ice and snow melting heater control assembly including at least one sensor, at least one heater element and a controller communicatively coupled with the at least one sensor and the at least one heater element, the controller directing status information about at least one sensor to the at least one heater element.

An advantage of the present invention is that a controller can be checked for operation without simulating an environment therefore.

Another advantage is that the heater controller of the present invention can provide status information to a technician.

Yet another advantage is that the control circuit can be manufactured without the need to include visual indicators or readouts on the control circuit itself.

Yet still another advantage is that the present invention allows the status of the automatic controller to be determined without the additional cost of any additional parts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
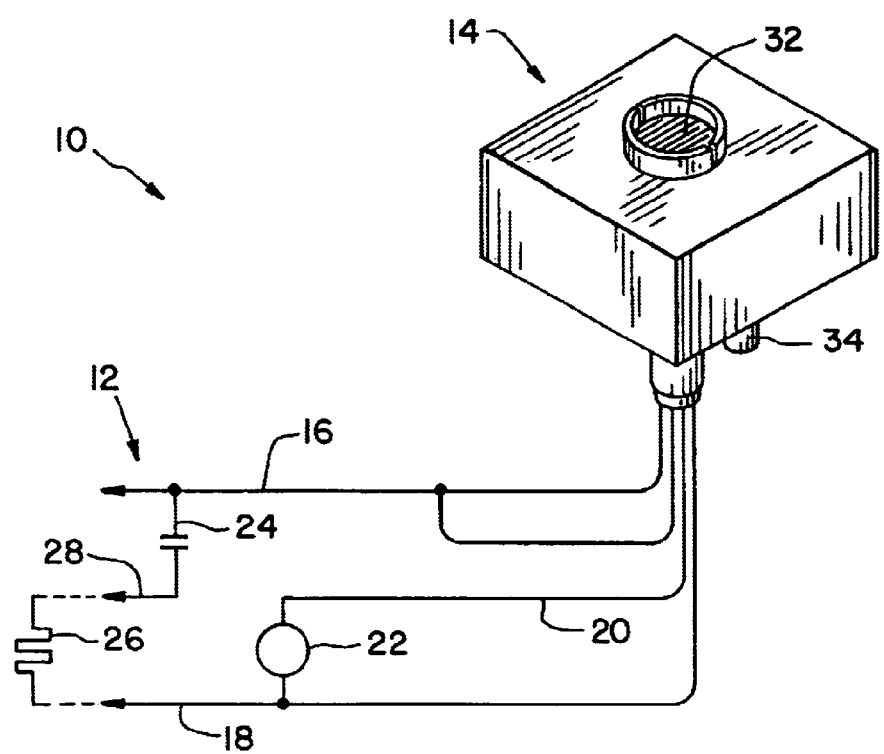
FIG. 1 is combination perspective view of an embodiment of a heater control of the present invention and a schematical form of typical external circuitry attached thereto.

Referring now to the drawings, and more particularly to FIG. 1, there is shown one embodiment of a deicing control system 10 of the present invention. System 10 includes power system 12 and control system 14.

Power system 12 includes power conductors 16 and 18, control conductor 20, relay coil 22, relay contact 24 and heater system 26. Power conductors 16 and 18 are connected to electrical power such as a 120 volt circuit. Power conductors 16 and 18 also provide power to control system 14. Control conductor 20 receives a signal from control system 14 that drives relay coil 22 causing a controllable connection of relay contact 24 thereby allowing power to flow from power conductor 16 through heater system 26 to power conductor 18. Heater system 26 can be the controlling pump of a hydronic heating system 26 or an electrical heating element 26.

Figure 2:
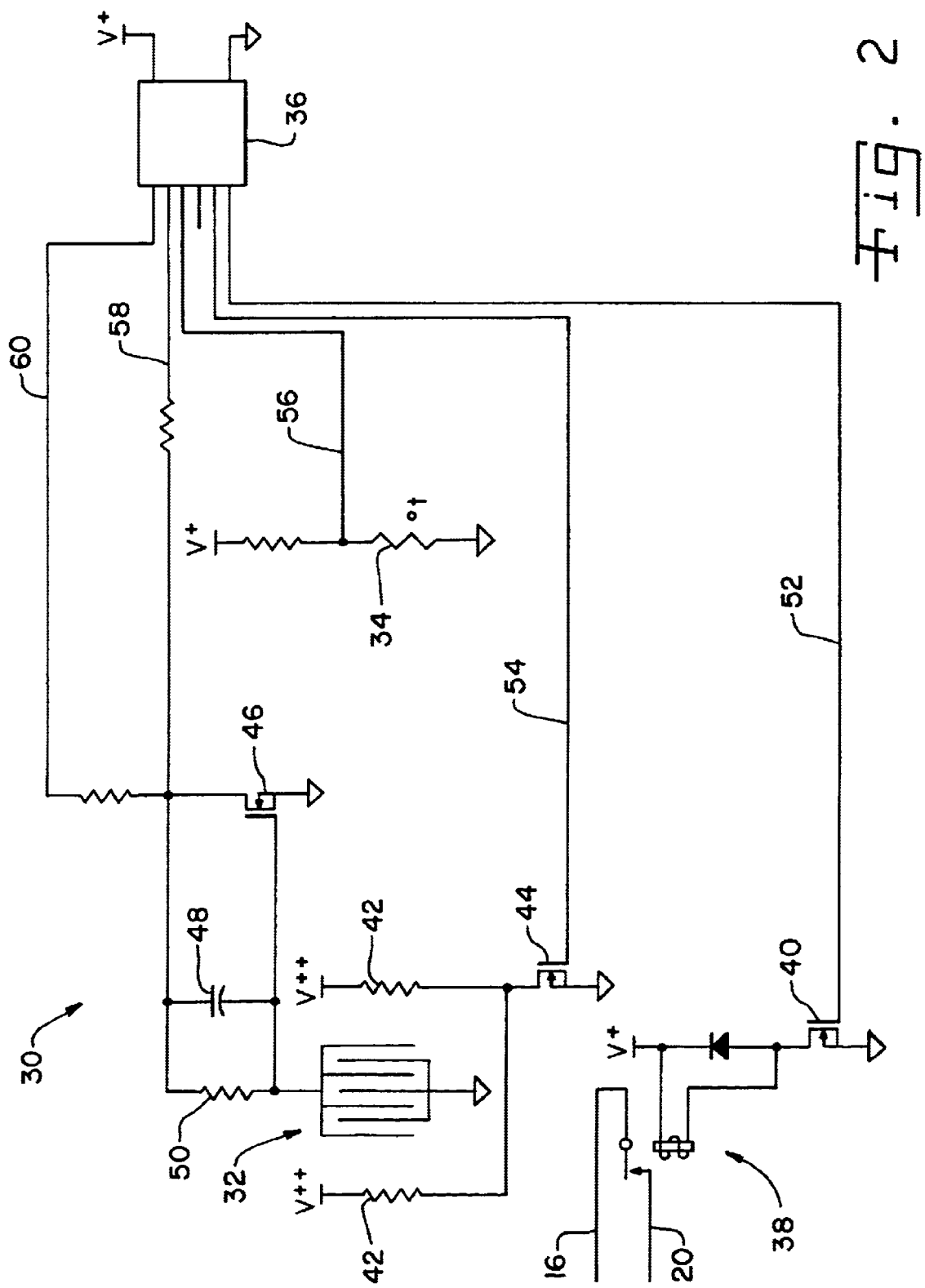
FIG. 2 is a schematic diagram of a heater control of FIG. 1.

Now, additionally referring to FIG. 2, there is shown a control circuit 30, which is part of control system 14. Control system 14 also includes moisture detector 32 and temperature detector 34. Moisture detector 32 includes a moisture grid that is a spaced apart interdigitated set of conductors exposed on the top of control system 14. Moisture, in the form of water, ice, snow and/or sleet on the surface of moisture detector 32 is detected by a current flow between fingers of the interdigitated conductors.

Prior moisture detectors measured the conductivity between the interdigitated conductors using an uninterrupted supply of a DC voltage. This causes electrochemical problems including polarization and copper electroplating that reduces the life expectancy and reliability of the sensor. Polarization occurs when DC current flows through the grid when wet. The water from melted snow and ice becomes an electrolyte due to atmospheric contamination and the ions therefrom are positioned, due to the constant electropotential on the interdigitated fingers. However, the circuit and method employed by the present invention reduces this problem to a negligible proportion by employing an active sensing technique that reduces the current through the moisture detection grid by more than an order of magnitude. Further, the circuit detects moisture on the sensing grid in the form of ice, in any form, without the need for heating the sensor to turn the ice into water. An advantage of this approach is that heat is not dissipated in the moisture sensor at a higher rate than that utilized in the pavement, or other application areas, where the heating element is distributing the heat. The advantage of this is that the moisture on the moisture detector will dissipate at the same rate as the moisture on the ground or other area under the control of control system 14. The selection of the power density that is applied to the moisture sensor to melt the snow and ice on the conductive grid is such that it operates to allow the snow and ice to be removed at approximately the same rate as that on the ground. This advantageously permits a shorter hold-on time of the heating system thereby saving energy. The hold-on time ensures complete melting of the moisture and the evaporation of any standing melt water. Power to the moisture sensor is turned off at temperatures above 38° F. At lower temperatures excitation of moisture detector 32 is continuous until precipitation is detected. Thereafter, moisture detector 32 is electrically activated at predetermined intervals, such as every six minutes, for a few seconds to check for the presence of moisture. If moisture had been previously detected, then the detection of a lack of moisture marks the beginning of the heater hold-on time interval. This modulating of the DC voltage on moisture detector 32 advantageously reduces the average current flowing through moisture detector 32 thereby prolonging its life.

Additionally, another technique in detecting moisture involves the measurement of AC conductivity of the moisture-sensing grid of moisture detector 32. Low frequency AC excitation reduces the electrochemical deterioration of the surface of the moisture sensing grid when it is exposed to precipitation in any form, since the average current is zero. Further, the measurement of the AC capacitance of the moisture-sensing grid of moisture detector 32 may be used to detect moisture.

Control circuit 30 incorporates a negative temperature coefficient precision thermistor 34 to convert the ambient temperature into a voltage value using half of a DC excited Wheatstone bridge. The other half of the bridge is supplied by a successive approximation routine that utilizes an analog-to-digital converter in microcontroller 36. Since both halves of the Wheatstone bridge are excited by supply voltage $V^+$, the encoded temperature value is essentially independent of variations in $V^+$.

Control circuit 30 includes microcontroller 36, relay 38, field effect transistor (FET) 40, heater elements 42, FET 44, FET 46, capacitor 48 and resistor 50. Controller 36 is interconnected with temperature detector 34, FETs 40, 44 and 46. FET 40 controls the driving power to relay 38, thereby providing an electrical connection between power line 16 and control line 20. This places microcontroller 36 in control of the power supplied to heating element 26. FET 44 is connected to resistive elements 42 that are proximate to and/or integrated with moisture detector 32. Resistors 42 provide heat to moisture detector 32 when energized by FET 44. FET 46 functions as an operational amplifier having a feedback capacitor 48 and a feedback resistor 50. Feedback capacitor 48 serves to integrate current conducted from moisture detector 32. Feedback resistor 50 provides a leak off of the integrated value otherwise integrated by FET 46, capacitor 48 and current from moisture detective 32.

Conductors 52, 54, 56, 58 and 60 electrically interconnect microcontroller 36 with elements of control circuit 30. Conductor 52 connects controller 36 with FET 40 thereby allowing controller 36 to turn power on to heater element 26 in a controllable manner. Conductor 54 is interconnected with controller 36 and FET 44 thereby controlling power to heating elements 42 that heat moisture detector 32. The control of heat to moisture detector 32 is selected such that the power density applied thereto matches the power density in the deicing area. Microcontroller 36 advantageously controls the power supplied to heater elements 42, in a programmed manner, to substantially match the heat density applied to moisture detector 32 to that supplied to the deicing area by way of heating element 26. Conductor 56 provides a voltage level from thermistor 34 that corresponds with the external temperature. The voltage level is utilized by controller 36 to determine the ambient temperature and decide when to activate FETs 40, 44 and 46. For example, if the temperature detected from thermistor 34 is above 38°, FETs 40, 44 and 46 will not be activated. When the temperature detected is below 38° F. moisture detector 32, by way of conductors 58 and 60, is activated to determine if any moisture is present on moisture detector 32. If moisture is detected on moisture detector 32, then conductor 52 is energized thereby causing FET 40 to be conductive causing the contact in relay 38 to close, thereby providing power to relay coil 20, causing relay contact 24 to close, thereby directing electrical power to heating element 26. FET 44 is modulated according to a prescribed power density to approximate the power density of heater element 26. Once moisture is detected from moisture detector 32, conductor 60 is de-energized for a predetermined amount of time. After the predetermined amount of time conductor 60 is re-energized to again detect the presence or absence of moisture on moisture detector 32. Conductor line 58 serves as a sensor input to microcontroller 36 and conductor 60 supplies power to moisture detector 32. Microcontroller 36 is a microprocessor driven controller and in the preferred embodiment a microchip 12C672 8-bit Harvard Architecture device is utilized. Microcontroller 36 advantageously has analog input and digital input/output ports, which are correspondingly interconnected to conductors 52, 54, 56, 58 and 60.

Figure 3:
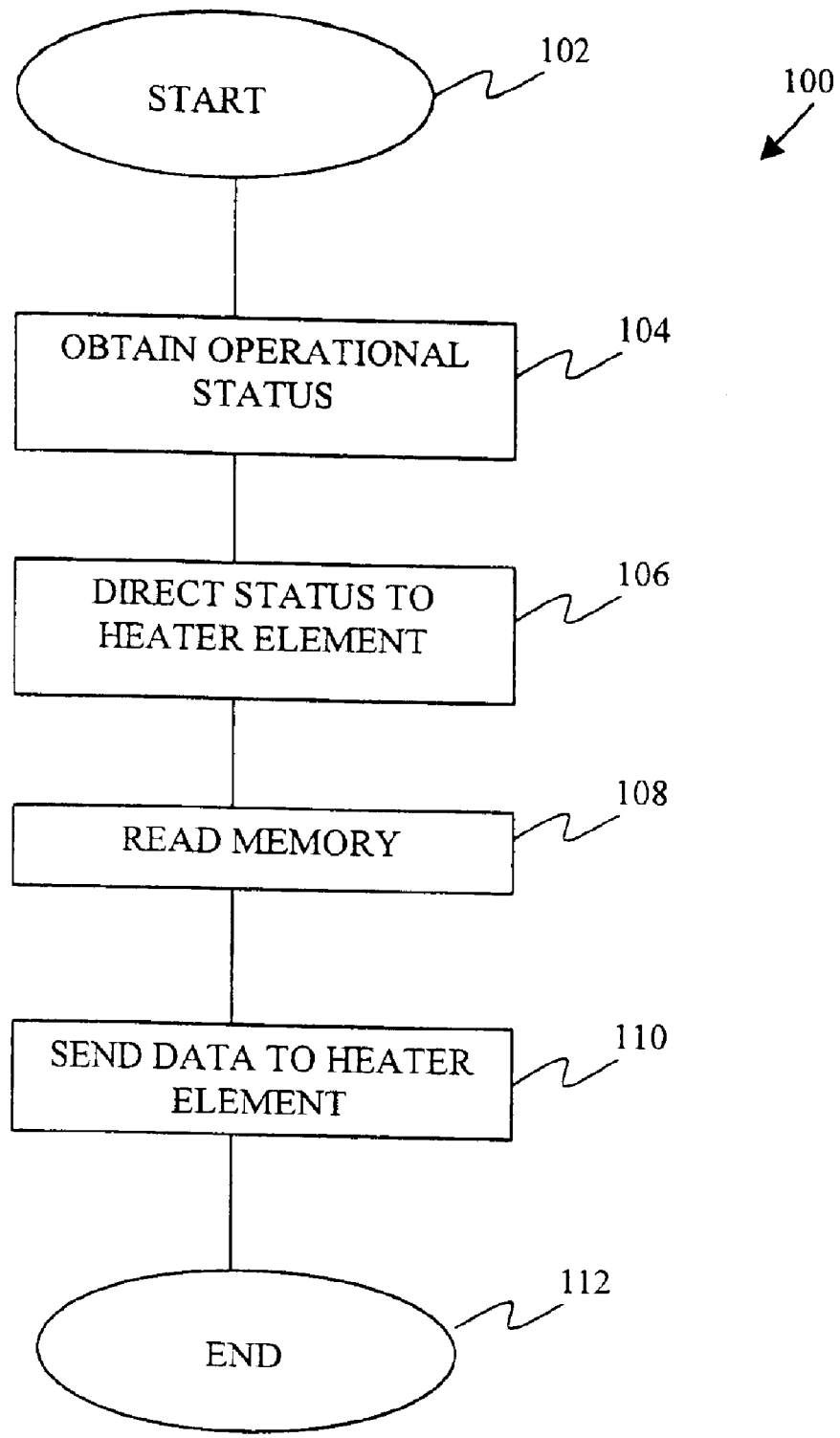
FIG. 3 is a block diagram of a method used by the heater controller of FIGS. 1 and 2.

Now, additionally referring to FIG. 3, there is shown a method 100 that is executed by microcontroller 36. Method 100 is initiated at step 102, upon power on of control system 14 or upon a manual initiation, for example, by the pressing of a button not shown. Upon initiation, method 100 proceeds to step 104 in which controller 36 obtains the operational status of control system 14. Operational status includes a test of moisture detector 32, a reading of temperature reported by detector 34 and the status of power applied to FETS 40, 44 and 46. Status information thus obtained at step 104 is then available for transmittal at step 106.

At step 106, status information about control system 14 is directed to heater element 26 by way of relay 38 and relay elements 22 and 24. The information is conveyed by a predetermined pulsing of relay 38 causing the current flowing through heating element 26 to be turned on and off in a predetermined pattern. The pulsing of the current through the heater element 26 can be detected by an operator having placed a clamp-on amp meter around conductor 28 to thereby detect the pattern being pulsed from control system 14. The information passed to heater element 26 includes the current temperature detected by temperature detector 34 and whether or not moisture detector 32 is detecting any moisture. Additionally, status regarding microcontroller 36 and the status of relay 38 upon turn on may be directed to heater element 26.

Method 100 proceeds to step 108 wherein controller 36 reads a memory contained within microcontroller 36 that contains historical operating information. The historical operating information may include performance in a previous time period such as the last time controller 36 energized heater element 26 and the duration thereof.

At step 110, microcontroller 36 sends the historical data to heater element 26 again by a predetermined pulsing pattern of power under the control of FET 40, relay 38 and relay elements 22 and 24. The information sent to heater element 26 is thereby interpreted by an operator observing a voltmeter detecting the application of voltage to heater element 26 or by way of an amp meter detecting the current through conductor 28. Alternatively, if relay elements 22 and 24 include a light circuit, the operator can detect the pulse pattern by observing the light on the relay or listen to the relay closures. Advantageously, the present invention conveys information regarding control system 14 to a user by way of a pulse pattern to the heating element, thereby allowing control system 14 to provide operating information without the need of applying a controlled temperature and moisture environment to temperature detector 34 and moisture detector 32 to thereby test the operation of control system 14.

The information provided from control system 14 to heater element 26 and conductor 28 may be in the form of pulsing steps, which include varying the time duration of pulses or the frequency of pulses in the pattern. The pattern of pulses is completed in a relatively short period of time upon turn power-up of control system 14. The relatively short period of time may be less than one minute in duration and more specifically less than 30 seconds. Additionally, the pulse pattern may be delayed for a short period of time allowing an operator to move from a power on switch to the amp meter to thereby detect the information. The delay in operation may be a predetermined time such as 2 minutes.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ice and snow melting heater control assembly, comprising:
    at least one sensor;
    at least one heater element; and
    a controller communicatively coupled with at least one said sensor and at least one said heater element, said controller directing status information, in the form of a coded signal, about at least one said sensor to at least one said heater element, said status information being directed to at least one said heater element regardless of ambient temperature.

2. The assembly of claim 1, wherein said status information includes at least one of temperature, moisture detection, controller status and historical operating conditions.

3. The assembly of claim 1, further comprising at least one conductor electrically connected to said heater element, said at least one conductor carrying electrical power to said heater element, said electrical power controlled by said controller.

4. The assembly of claim 3, wherein said status information is observed by measuring current variations through at least one said conductor.

5. The assembly of claim 1, wherein said controller creates a pattern to convey said status information to said heater circuit.

6. The assembly of claim 5, wherein said pattern lasts less than a predetermined time.

7. The assembly of claim 6, wherein said predetermined time is thirty seconds.

8. The assembly of claim 1, wherein said at least one sensor includes at least one moisture sensor, said moisture sensor being periodically energized by said controller.

9. The assembly of claim 8, wherein said at least one sensor is a plurality of sensors including a temperature sensor, said moisture sensor remaining unenergized if a temperature detected by said temperature sensor is above a predetermined temperature.

10. The assembly of claim 9, wherein said predetermined temperature is approximately 38 degrees Fahrenheit.

11. A heater control assembly, comprising:
    a heater circuit; and
    a controller communicatively coupled to said heater circuit, said controller directing status information of the control assembly, in the form of a coded signal, to said heater circuit regardless of ambient temperature.

12. The assembly of claim 11, wherein said heater circuit includes at least one heating element and at least one conductor connecting said controller to at least one said heating element.

13. The assembly of claim 12, wherein said status information is observed by measuring current variations through at least one said conductor.

14. The assembly of claim 11, wherein said controller creates a pattern to convey said status information to said heater circuit.

15. The assembly of claim 14, wherein said pattern lasts less than thirty seconds.

16. A method of conveying operational status of an ice and snow melting heater control system, comprising:
    detecting an event by the heater control system;
    obtaining information about the operational status of said heater control system; and
    sending data in the form of a coded signal on an electrical power conductor to a heater element based on said information regardless of ambient temperature.

17. The method of claim 16, wherein said event is at least one of upon power being applied and manual initiation.

18. The method of claim 16, wherein said information includes at least one of electrical power being applied, temperature, moisture detection, controller status and historical operating conditions.

19. The method of claim 16, wherein said sending step includes the substep of pulsing electrical power to said electrical power conductor in an on and off pattern, said pattern dependant upon said information.

20. The method of claim 19, wherein said pulsing step includes varying at least one of time duration and frequency of said pattern.

21. The method of claim 19, wherein said event is upon power being applied, and said information includes at least one of electrical power being applied, temperature, moisture detection, controller status and historical operating conditions.

22. The method of claim 21, further comprising the step of detecting said pattern in a conductor by way of an ampere meter.

23. The method of claim 19, wherein said pattern is completed within thirty seconds of said event.

* * * * *